(12) United States Patent
Greenbank et al.

(10) Patent No.: US 11,697,580 B2
(45) Date of Patent: Jul. 11, 2023

(54) APPARATUS FOR HYDROCARBON VAPOR RECOVERY

(71) Applicant: CALGON CARBON CORPORATION, Moon Township, PA (US)

(72) Inventors: Michael Greenbank, Monaca, PA (US); Michael E. Lutz, Industry, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 323 days.

(21) Appl. No.: 16/529,541

(22) Filed: Aug. 1, 2019

(65) Prior Publication Data
US 2020/0039809 A1 Feb. 6, 2020

Related U.S. Application Data

(60) Provisional application No. 62/713,335, filed on Aug. 1, 2018.

(51) Int. Cl.
*B01D 53/04* (2006.01)
*B67D 7/04* (2010.01)
(Continued)

(52) U.S. Cl.
CPC ........... *B67D 7/049* (2013.01); *B01D 5/0009* (2013.01); *B01D 53/0438* (2013.01);
(Continued)

(58) Field of Classification Search
CPC ............... B01D 53/04; B01D 53/0407; B01D 53/0438; B01D 53/0462; B01D 9/0009;
(Continued)

(56) References Cited

U.S. PATENT DOCUMENTS 2,038,071 A 4/1936 Wilhelm
3,164,452 A * 1/1965 Westeren ............... B01D 53/26
95/123
(Continued)

FOREIGN PATENT DOCUMENTS

EP 0433677 A1 6/1991
EP 1413348 A1 4/2004
(Continued)

OTHER PUBLICATIONS

Supplementary European Search Report in corresponding European Application No. 14813604.7 dated Jan. 30, 2017.
(Continued)

*Primary Examiner* — Frank M Lawrence, Jr.
(74) *Attorney, Agent, or Firm* — DLA Piper LLP (US)

(57) ABSTRACT

A Vapor Recovery Unit (VRU) includes a VRU heat exchanger and a sorbent material for the recovery of hydrocarbon vapors from the ullage of tanks. The VRU heat exchanger and sorbent material are useful in conjunction with a thermal transfer fluid to control the temperatures of the sorbent material during endothermic and exothermic reactions that occur when hydrocarbon vapors are adsorbed and desorbed, which increases performance and reduces the amount of sorbent material required to recover hydrocarbon vapors.

4 Claims, 2 Drawing Sheets

(51) Int. Cl.
  *B01D 5/00* (2006.01)
  *B01J 20/28* (2006.01)

(52) U.S. Cl.
  CPC ...... *B01D 53/0462* (2013.01); *B01J 20/2804* (2013.01); *B01D 2253/102* (2013.01); *B01D 2253/34* (2013.01); *B01D 2257/708* (2013.01); *B01D 2257/7022* (2013.01); *B67D 2007/0494* (2013.01)

(58) Field of Classification Search
  CPC ........ B01D 2253/102; B01D 2253/108; B01D 2253/34; B01D 2257/7022; B01D 2257/708; B01D 2259/4516; B01J 20/2804; B67D 7/04; B67D 7/0488; B67D 7/049; B67D 2007/0494
  USPC ...................... 96/121, 126–128; 95/115, 146
  See application file for complete search history.

(56) References Cited

U.S. PATENT DOCUMENTS

| | | | |
|---|---|---|---|
| 3,713,281 A | 1/1973 | Asker et al. | |
| 3,730,158 A | 5/1973 | St. Amand | |
| 3,757,488 A | 9/1973 | Austin et al. | |
| 3,867,111 A * | 2/1975 | Knowles | B01D 53/04 95/21 |
| 4,331,639 A | 5/1982 | Hass et al. | |
| 4,338,101 A * | 7/1982 | Tuttle | B01D 53/04 95/105 |
| 4,343,629 A * | 8/1982 | Dinsmore | B01D 53/04 95/104 |
| 4,418,662 A | 12/1983 | Engler et al. | |
| 4,444,727 A * | 4/1984 | Yanagihara | C01B 3/0005 422/223 |
| 5,016,628 A | 5/1991 | Lambert | |
| 5,021,071 A * | 6/1991 | Reddy | B60K 15/03504 123/518 |
| 5,064,805 A | 11/1991 | Otowa | |
| 5,194,414 A | 3/1993 | Kuma | |
| 5,207,734 A * | 5/1993 | Day | F01N 3/0835 60/278 |
| 5,310,593 A | 5/1994 | Tsujimoto et al. | |
| 5,322,778 A | 6/1994 | Antrim et al. | |
| 5,338,458 A | 8/1994 | Carrubba et al. | |
| 5,348,755 A | 9/1994 | Roy | |
| 5,352,274 A | 10/1994 | Blakley | |
| 5,500,038 A | 3/1996 | Dauber et al. | |
| 5,598,721 A | 2/1997 | Rockenfeller et al. | |
| 5,658,369 A * | 8/1997 | Kusay | B01D 53/0476 95/106 |
| 5,713,881 A | 2/1998 | Rezai et al. | |
| 5,726,118 A | 3/1998 | Ivey et al. | |
| 5,754,002 A | 5/1998 | Haitko et al. | |
| 5,820,644 A | 10/1998 | Mori et al. | |
| 5,821,682 A | 10/1998 | Foust et al. | |
| 5,861,050 A | 1/1999 | Pittel et al. | |
| 5,871,568 A * | 2/1999 | Gibson | B01D 53/1418 96/122 |
| 5,897,779 A | 4/1999 | Wisted et al. | |
| 5,952,420 A | 9/1999 | Senkus et al. | |
| 5,964,221 A | 10/1999 | McKenna | |
| 6,047,687 A | 4/2000 | Ishikawa et al. | |
| 6,146,451 A | 11/2000 | Sakata et al. | |
| 6,176,897 B1 | 1/2001 | Keefer | |
| 6,186,939 B1 | 2/2001 | Forrester | |
| 6,261,345 B1 * | 7/2001 | Miyano | B01D 53/0423 95/96 |
| 6,342,129 B1 | 1/2002 | Vaughn et al. | |
| 6,406,523 B1 | 6/2002 | Connor et al. | |
| 6,472,343 B1 | 10/2002 | McCrae et al. | |
| 6,599,856 B1 | 7/2003 | Uchino et al. | |
| 6,652,627 B1 * | 11/2003 | Tonkovich | B01D 53/0423 95/104 |
| 6,699,393 B2 | 3/2004 | Baker et al. | |
| 6,706,194 B2 | 3/2004 | Baker et al. | |
| 6,848,374 B2 | 2/2005 | Srinivasachar et al. | |
| 7,077,891 B2 * | 7/2006 | Jaffe | B01D 53/0423 96/108 |
| 7,222,612 B2 | 5/2007 | Hagler et al. | |
| 7,278,406 B2 | 10/2007 | Hagler | |
| 7,326,278 B2 * | 2/2008 | Butters | B01D 5/0054 210/188 |
| 7,547,350 B2 | 6/2009 | Callahan et al. | |
| 7,666,507 B2 | 2/2010 | Ishikawa et al. | |
| 7,704,305 B2 | 4/2010 | Nishida | |
| 7,708,817 B2 | 5/2010 | Hurley et al. | |
| 7,744,677 B2 * | 6/2010 | Barclay | B01D 53/0462 95/114 |
| 7,780,765 B2 | 8/2010 | Srinivasachar et al. | |
| 7,858,061 B2 | 12/2010 | Varma et al. | |
| 7,862,725 B2 | 1/2011 | Mazyek et al. | |
| 7,879,136 B2 | 2/2011 | Mazyek | |
| 3,034,163 A1 | 10/2011 | Durham et al. | |
| 8,042,524 B2 | 10/2011 | Elum et al. | |
| 8,057,576 B1 | 11/2011 | Pollack | |
| 8,069,797 B2 | 12/2011 | Srinivasachar et al. | |
| 8,080,088 B1 | 12/2011 | Srinivasachar | |
| 8,168,147 B2 | 5/2012 | Olson et al. | |
| 8,263,524 B1 | 9/2012 | Skandan et al. | |
| 8,372,477 B2 | 2/2013 | Buelow et al. | |
| 8,632,334 B2 | 1/2014 | Knueppel et al. | |
| 8,864,877 B2 | 10/2014 | Nishita et al. | |
| 2002/0124732 A1 | 9/2002 | Hara et al. | |
| 2002/0124733 A1 | 9/2002 | Iriyama et al. | |
| 2002/0170436 A1 | 11/2002 | Keefer et al. | |
| 2003/0037672 A1 * | 2/2003 | Sircar | B01D 53/0462 96/121 |
| 2003/0116021 A1 | 6/2003 | Oda et al. | |
| 2003/0188663 A1 | 10/2003 | Barthel et al. | |
| 2004/0116014 A1 | 6/2004 | Soerens et al. | |
| 2004/0118287 A1 | 6/2004 | Jaffe et al. | |
| 2004/0118387 A1 | 6/2004 | Lawrence | |
| 2004/0197612 A1 | 10/2004 | Keefer et al. | |
| 2004/0262217 A1 | 12/2004 | Mori et al. | |
| 2005/0081717 A1 | 4/2005 | Meiller et al. | |
| 2005/0167367 A1 | 8/2005 | Baker | |
| 2005/0172805 A1 | 8/2005 | Motono et al. | |
| 2006/0032372 A1 | 2/2006 | Dauber et al. | |
| 2006/0042467 A1 | 3/2006 | Maru | |
| 2006/0054142 A1 | 3/2006 | Burke et al. | |
| 2006/0142154 A1 | 6/2006 | Wolff | |
| 2006/0205830 A1 | 9/2006 | Lebowitz et al. | |
| 2007/0034193 A1 | 2/2007 | King | |
| 2007/0101865 A1 * | 5/2007 | Kim | B01D 53/0415 96/134 |
| 2007/0113740 A1 | 5/2007 | Oda | |
| 2007/0169758 A1 | 7/2007 | Mills | |
| 2007/0272080 A1 | 11/2007 | Allen et al. | |
| 2008/0121142 A1 | 5/2008 | Comrie et al. | |
| 2008/0141637 A1 | 6/2008 | Hirata et al. | |
| 2008/0308075 A1 | 12/2008 | Allen et al. | |
| 2009/0172998 A1 | 7/2009 | Harris et al. | |
| 2009/0223370 A1 | 9/2009 | Kosugi et al. | |
| 2010/0178624 A1 | 7/2010 | Srinivasachar | |
| 2010/0300288 A1 | 12/2010 | Boulet et al. | |
| 2011/0030592 A1 | 2/2011 | Baldrey et al. | |
| 2011/0072974 A1 | 3/2011 | Patel | |
| 2011/0100223 A1 | 5/2011 | Tarrant et al. | |
| 2011/0214572 A1 | 9/2011 | Hasegawa et al. | |
| 2012/0048110 A1 | 3/2012 | Dawes et al. | |
| 2012/0079926 A1 | 4/2012 | Long et al. | |
| 2012/0100054 A1 | 4/2012 | Durham et al. | |
| 2013/0078169 A1 | 3/2013 | LaFlesh et al. | |
| 2013/0109562 A1 | 5/2013 | Wong et al. | |
| 2013/0269532 A1 | 10/2013 | Kimoto | |
| 2013/0276634 A1 | 10/2013 | McKenna et al. | |
| 2013/0330257 A1 | 12/2013 | Tramposch | |
| 2014/0117054 A1 | 5/2014 | Ryan et al. | |
| 2014/0165542 A1 | 6/2014 | Loftin et al. | |
| 2014/0216261 A1 | 8/2014 | Fleming, Jr. | |
| 2014/0295134 A1 | 10/2014 | Wood et al. | |
| 2014/0352542 A1 | 12/2014 | Mani | |

(56) References Cited

U.S. PATENT DOCUMENTS

| | | |
|---|---|---|
| 2014/0374655 A1 | 12/2014 | Mimna |
| 2015/0050202 A1 | 2/2015 | Filippelli et al. |
| 2016/0031318 A1 | 2/2016 | Shimokawa |
| 2016/0166972 A1 | 6/2016 | Owens et al. |
| 2016/0271555 A1 | 9/2016 | Hiltzik et al. |
| 2018/0030871 A1 | 2/2018 | Hiltzik et al. |
| 2018/0214816 A1* | 8/2018 | Greenbank ........ B01D 53/0415 |
| 2018/0229217 A1 | 8/2018 | Mazzoccoli et al. |
| 2018/0363594 A1 | 12/2018 | Byrne et al. |
| 2019/0134558 A1 | 5/2019 | Billiet et al. |
| 2019/0247831 A1 | 8/2019 | Tramposch et al. |
| 2019/0262573 A1 | 8/2019 | McKenna et al. |
| 2021/0023532 A1 | 1/2021 | Greenbank et al. |
| 2021/0172402 A1 | 6/2021 | Byrne et al. |

FOREIGN PATENT DOCUMENTS

| | | |
|---|---|---|
| GB | 1336241 A | 11/1973 |
| JP | S55-107056 A | 8/1980 |
| JP | 2001-505813 A | 5/2001 |
| JP | 2004-154652 A | 6/2004 |
| JP | 2006-068588 A | 3/2006 |
| JP | 2008023365 A | 2/2008 |
| JP | 2016500784 A | 1/2016 |
| KR | 10-1118048 B1 | 2/2012 |
| KR | 2016-0107150 A | 9/2016 |
| WO | 2004089501 A2 | 10/2004 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013083992 A1 | 6/2013 |
| WO | 2014082076 A1 | 5/2014 |
| WO | 2014088630 A1 | 6/2014 |
| WO | 2014205200 A1 | 12/2014 |
| WO | 2015/053815 A1 | 4/2015 |
| WO | 2018144588 A1 | 8/2018 |

OTHER PUBLICATIONS

International Search Report and Written Opinion for PCT/US2014/043158 dated Oct. 28, 2014.
Raposo et al., Mercury Speciation in Fluorescent Lamps by Thermal Release Analysis (2003), Waste Management 23(10):879-886.
International Search Report and Written Opinion for PCT/US2019/44964 dated Oct. 18, 2019.
International Search Report and Written Opinion for Application No. PCT/US2019/044958 dated Oct. 24, 2019.

* cited by examiner

APPARATUS FOR HYDROCARBON VAPOR RECOVERY

CROSS-REFERENCE TO RELATED APPLICATIONS

This application claims priority to U.S. Provisional Application Ser. No. 62/713,335 filed on 1 Aug. 2018, the entirety of which is hereby incorporated by reference.

BACKGROUND

The recovery of hydrocarbon fluids, especially vapors is a well-known challenge in the chemical and transport industries. When any quantity of organic compounds such as hydrocarbon fuels are handled, stored, or transferred between tanks, the fluids trapped in the tank ullage must be accounted for. The fluids are problematic at a basic level because they can create an explosion hazard, especially if oxygen makes its way into the ullage in the tank. Prior art mitigation of these concerns by venting the trapped vapors or flaring is undesirable because doing so pollutes the environment and wastes valuable product.

Another prior art approach is to adsorb the trapped ullage vapors in a bed of activated carbon which is part of a Vapor Recovery Unit (VRU or VRUs). This approach is common in fuel terminals where large quantities of gasoline are transferred from stationary tanks to on-highway trucks for delivery to gasoline filling stations. The on-highway trucks have tanks that typically hold between 5,000 and 10,000 gallons of gasoline fuel. During gasoline transfer, the gasoline vapors trapped in the tank ullage are piped to beds that contain about 5,000 lb to about 10,000 lb of activated carbon. The activated carbon may be in deep bed granular or pelleted form, and the activated carbon adsorbs the gasoline vapors from the tank ullage. After the transfer is complete and the vapors are adsorbed, a low pressure vacuum is created over the activated carbon to desorb the gasoline vapors, and the desorbed vapors are then cooled to cause the vapors to condense into a liquid. The condensed liquid is thereby recovered and may be stored for future use.

The prior art VRUs also have drawbacks. The activated carbon beds are large and consume a significant footprint at the terminal or plant. The activated carbon beds also have significant thermal mass, which is challenging because the adsorption of gasoline vapors is exothermic, and the desorption is endothermic. Furthermore, the adsorption rate is limited by the temperature of the activated carbon, and higher temperatures lower the rate of adsorption. Thus, conventional VRUs limit the rate at which gasoline vapors can be adsorbed or desorbed, and also mean that a typical terminal will have at least two activated carbon beds, with each bed to be used in alternating fashion. This requires further equipment expenditures and grounds footprint.

It would be advantageous if a VRU design could solve these and other problems of the prior art by reducing the size and weight of the VRU, controlling heat generated or required by exothermic and endothermic conditions, and enabling more rapid fuel transfer and vapor recovery.

SUMMARY

Embodiment 1: A vapor recovery unit heat exchanger (VRU heat exchanger), comprising at least one sorbent material chamber that includes a sorbent material, a heat transfer fluid chamber, a manifold in communication with the ullage space of a tank, wherein during operation, the sorbent material captures or releases fluids that originated in the ullage space of the tank.

Embodiment 2: The VRU of embodiment 1, wherein the sorbent material is provided within one or more sorbent material sheets, and the sorbent material sheets further comprise a binder.

Embodiment 3: The VRU of embodiments 1 or 2, wherein the binder is selected from the group consisting of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (Bo-PET), polychloroprene, copolymers of any of the preceding binders, and mixtures of any preceding binders.

Embodiment 4: The VRU of embodiments 1-3, wherein the amount of binder is about 2 wt. % to about 30 wt. % of a total composition of the sorbent material sheets.

Embodiment 5: The VRU of embodiments 1-4, wherein the sorbent material sheets are wound in a spiral shape or are wound in a concentric circular shape.

Embodiment 6: The VRU of embodiments 1-5, wherein the sorbent material sheets have a thickness of about 0.01 mm to about 2 mm.

Embodiment 7: The VRU of embodiments 1-6, wherein the sorbent material is selected from the group consisting of activated carbon, natural zeolite, synthetic zeolite, silica, silica gel, alumina, zirconia, diatomaceous earths, and combinations thereof.

Embodiment 8: The VRU of embodiments 1-7, wherein the sorbent material is an activated carbon that is formed from at least one of bagasse, bamboo, coconut husks, peat, wood, lignite, coal, coal tar, petroleum pitch, asphalt and bitumen, chlorinated polymers, corn stalks and husks, wheat straw, spent grains, rice hulls and husks, and nutshells.

Embodiment 9: The VRU of embodiments 1-8, wherein the sorbent material has a BWC of about 7.0 g/100 cc to about 30 g/100 cc.

Embodiment 10: The VRU of embodiments 1-9, wherein the sorbent material comprises a thermally conductive filler.

Embodiment 11: The VRU of embodiments 1-10, wherein the thermally conductive filler is selected from the group consisting of transition metals, aluminum, steel, copper, silver, boron nitride, graphite, carbon black, alumina, diamond, silica, and combinations thereof.

Embodiment 12: A vapor recovery unit (VRU), comprising a first VRU heat exchanger that comprises at least one sorbent material chamber that includes a sorbent material, a heat transfer fluid chamber, a manifold in communication with the ullage space of a tank, wherein during operation, the sorbent material captures or releases fluids that originated in the ullage space of the tank; and a second VRU heat exchanger that comprises at least one sorbent material chamber that includes a sorbent material, a heat transfer fluid chamber, a manifold in communication with the ullage space of a tank, wherein during operation, the sorbent material captures or releases fluids that originated in the ullage space of the tank; and a thermal transfer fluid connection between the first VRU heat exchanger and the second VRU connection, wherein the thermal transfer fluid connection permits thermal transfer fluid to be exchanged between the first VRU heat exchanger and the second VRU heat exchanger.

Embodiment 13: The VRU of embodiment 12, further comprising a temperature control device that heats or cools the thermal transfer fluid.

Embodiment 14: The VRU of embodiments 12 or 13, further comprising a thermal transfer fluid storage medium for storing and dispensing the thermal transfer fluid to the first VRU heat exchanger, the second VRU heat exchanger, or both.

Embodiment 15: A method for operating a vapor recovery unit (VRU) wherein the VRU includes a first VRU heat exchanger and a second VRU heat exchanger, the method comprising operating the first VRU in an exothermic adsorption mode, thereby generating waste heat, operating the second VRU in an endothermic desorption mode, thereby cooling the second VRU; removing the waste heat by moving a heat transfer fluid through the first VRU; and dissipating at least a first portion of the waste heat by moving the heat transfer fluid through the second VRU.

Embodiment 16: The method of embodiment 15, further comprising storing heat transfer fluid until the heat transfer fluid is moved through the first VRU heat exchanger or the second VRU heat exchanger.

Embodiment 17: The method of embodiments 15 or 16, further comprising dissipating at least a second portion of the waste heat in a radiator or evaporative cooler.

DRAWINGS

DETAILED DESCRIPTION

Figure 1:
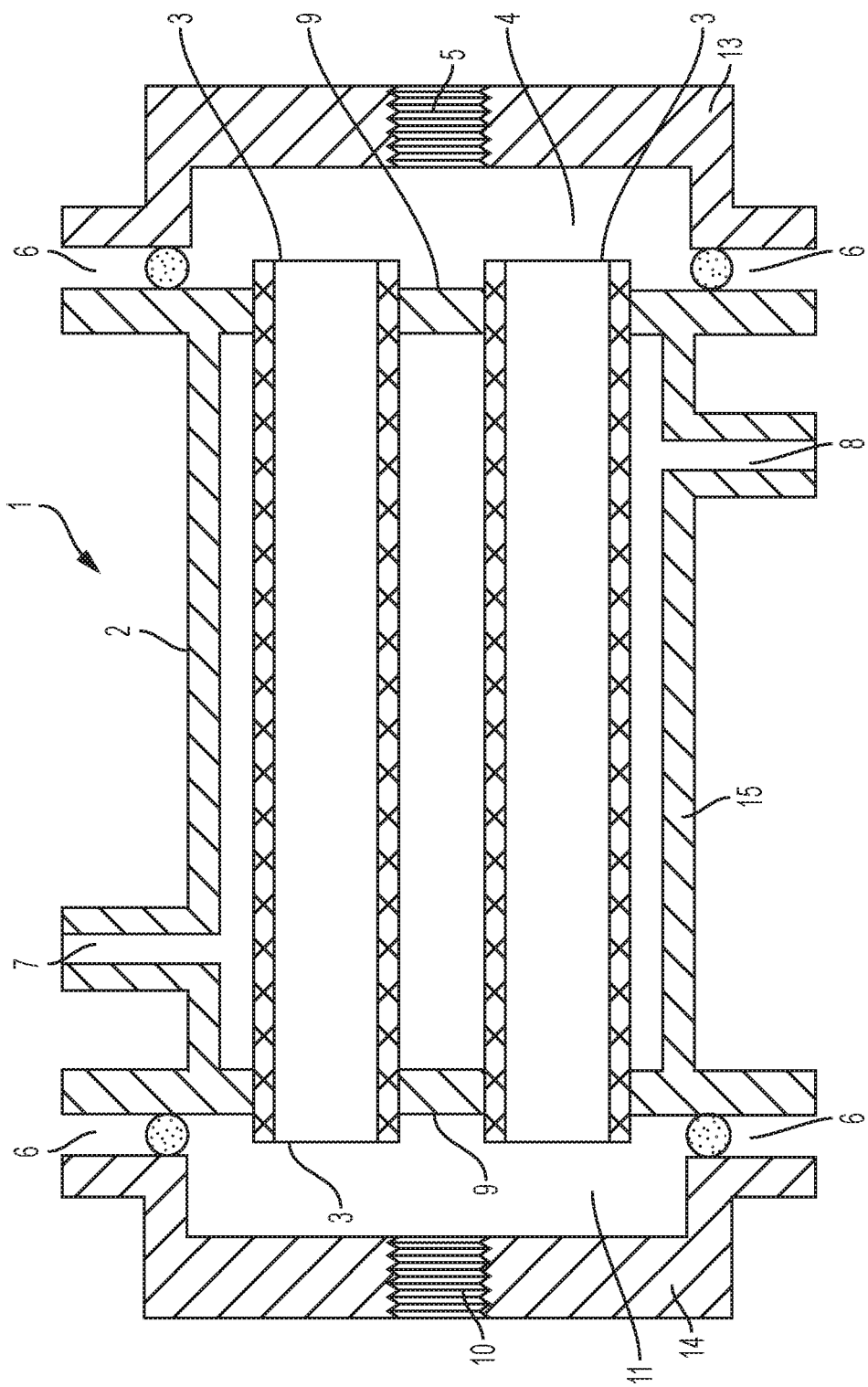
FIG. 1 is a cross-sectional view of a VRU heat exchanger of the invention.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a sorbent sheet" is a reference to "one or more sorbent sheets" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all known materials from any source that are capable of absorbing or adsorbing liquids and/or gases. For example, sorbent materials include, but are not limited to, activated carbon, carbon nanotubes, graphenes, natural and synthetic zeolite, silica, silica gel, alumina, zirconia, and diatomaceous earths.

The Sorbent Material

In some embodiments, the sorbent material includes one or more of activated carbon, carbon nanotubes, graphenes-natural zeolite, synthetic zeolite, silica, silica gel, alumina, zirconia, or diatomaceous earths. In some embodiments, the sorbent material is activated carbon.

One problem with prior art VRUs that are intended for recovery of flammable hydrocarbons is that high performance sorbents cannot be selected for fear of dangerous interactions. The exothermic reaction of vapor adsorption combined with the flammability of surrounding hydrocarbons means that the carbons must remain stable to protect against ignition. This means that the sorbents are selected for their stability to oxidation at all encountered temperatures, rather than their ability to adsorb and desorb butane. As an example, for activated carbon sorbents, prior art VRUs could not include activated carbons which were activated using phosphoric acid, because these could be an ignition hazard. As will be seen below, the VRU disclosed herein opens the possibility to select the highest performing sorbents, including carbons activated using chemical treatments such as phosphoric acid.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activated. The raw material, such as wood, nutshell, coal, pitch, etc. is oxidized and devolatized, with steam and/or carbon dioxide gasified to form the pore structure in the activated carbon which is useful for adsorption. The initial oxidation and devolatilization process may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material of the claimed invention involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity ("BWC") according to the ASTM D5228 method which is a measure of activated carbon performance. The selection of activated carbon particles having the highest BWC means that the VRU of the invention is more compact than prior art VRUs while offering the same or higher performance.

The BWC for each sorbent material may be greater than about 10 g/100 cc, and in some embodiments, the BWC may be from about 7.0 g/100 cc to about 30 g/100 cc, about 8.0 g/100 cc to about 25 g/100 cc, about 10 g/100 cc to about 20 g/100 cc, about 10 g/100 cc to about 15 g/100 cc, about 11 g/100 cc to about 15 g/100 cc, about 12 g/100 cc to about 15 g/100 cc or any individual BWC or range encompassed by these example ranges. In other examples, the BWC may be about 9 g/100 cc to about 15 g/100 cc, about 12 g/100 cc to about 20 g/100 cc, about 13 g/100 cc to about 20 g/100 cc, about 14 g/100 cc to about 20 g/100 cc, or about 15 g/100 cc to about 20 g/100 cc. It is also contemplated that any of the endpoints of the above ranges may be combined to form new and distinct ranges.

The activated carbon may be formed from materials including bagasse, bamboo, coconut husks, peat, wood such as hardwood and softwood sources in the form of sawdust and scrap, lignite, coal and coal tar, petroleum pitch, asphalt and bitumen, chlorinated polymers, corn stalks and husks, wheat straw, spent grains, rice hulls and husks, nutshells, and combinations thereof.

The sorbent material may be provided in the form of a powder, pellets, granules, or within sorbent material sheets. The sorbent material sheets may be formed of one or more from cloth, paper, plastics, ceramics, or metals that include the above described sorbents. In some embodiments, the sorbent material sheets include plastics which may be in the form of a binder.

The sorbent material sheets include any of the sorbent materials described above including, but are not limited to, activated carbon, carbon nanotubes, graphenesnatural and synthetic zeolite, silica, silica gel, alumina, zirconia, and diatomaceous earths, and in certain embodiments, the sorbent material may be composed of activated carbon. The sorbent materials may be used alone or in combination.

In some embodiments, the sorbent material sheets are in the form of multiple, separated sheets, with sides and/or surfaces in proximity to each other. In other embodiments, the sorbent material sheet is in the form of only a single sheet that has been wound or folded over on itself to yield a stacked, wound, or otherwise constructed mass of the sheet with sides and/or surface of the sheet in proximity to each other. In still other embodiments, multiple sheets are stacked together and then wound or otherwise folded over, forming alternating layers in a single mass.

The Sorbent Material Sheets

The sorbent material sheets may include one or more binders. Embodiments are not limited to particular binders, which can include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The amount of binder may be about 2 wt. % to about 40 wt. %, and in certain embodiments, the amount of binder may be about 2 wt. % to about 20 wt. %, about 2 wt. % to about 15 wt. %, about 5 wt. % to about 15 wt. %, about 2 wt. % to about 10 wt. % by weight, about 11 wt. %, or any individual amount or range encompassing these example amounts. In some embodiments, the sorbent material sheets may include a solvent, which may generally be present in small, residual, amounts of, for example, less than 10%, less than 5%, or less than 2% and greater than about 0.1% or 0.2% by weight. In particular, in some embodiments the sorbent material sheets may have no (0%) solvent. All amounts of binder and/or solvent are measured with respect to the total weight of the overall sorbent material.

In some embodiments, the sorbent material sheets are textured to form textured sorbent material sheets. The textured sorbent material sheets may be composed of a sorbent material and a binder and have a thickness sufficient to allow portions of the sheet to be compressed creating hills and valleys of desired cross-sectional size and shape.

In some embodiments, the sorbent material sheets have a thickness of less than about 2 mm, less than about 1.8 mm, less than about 1.6 mm, less than about 1.4 mm, less than about 1.2 mm, less than about 1.0 mm, about 0.01 mm to about 2 mm, about 0.01 mm to about 1.8 mm, about 0.1 mm to about 1.6 mm, about 0.01 mm to about 1.4 mm, about 0.01 mm to about 1.2 mm, about 0.01 mm to about 1.0 mm, about 0.02 mm to about 0.90 mm, about 0.05 to about 0.95 mm, about 0.05 to about 0.90 mm or any individual thickness or range encompassed by these example ranges. In some embodiments, an extra thick, i.e., greater than 0.9 mm, activated carbon sheet was pressed between a flat surface and the textured surface of a mold to form a textured sorbent material sheet. The overall average thickness of the sheet was reduced and texture was added to only one side of the sheet. The sheet thickness would vary with the hills and valleys of the texture pattern. This single sheet was stable with time and temperature because it has no means of relaxing to the original thick sheet. This approach was possible with the thicker activated carbon sheet material due to its malleability.

The sorbent material sheets may be textured on one or both sides. In some embodiments, the pattern and resultant channels are parallel or co-linear with the flow of the fluid through the sheets to achieve the low pressure drop. The texture may also itself form channels and flow that are not straight, such as angled, serpentine, irregular, or more complicated.

In some embodiments, the textured sorbent material sheets may have a thickness measured at a hill or peak of about 1.0 to about 1.5 mm, about 1.4 mm, about 1.3 mm, about 1.2 mm, or any individual thickness or range encompassed by any two of these values.

In some embodiments, the distance from the tip of a hill to the bottom of a valley is about 0.5 mm to about 0.1 mm. In some embodiments, the distance is about 0.4 mm, about 0.3 mm, about 0.2 mm, or any individual distance or range encompassed by any two of these values.

The sorbent material sheets of various embodiments may have a density of about 0.05 g/cc to about 2.0 g/cc, and in other embodiments, the sorbent material sheets may have a density of 0.08 g/cc to about 1.5 g/cc, about 0.1 g/cc to about 1.3 g/cc, or any density or range encompassed by these example ranges. The density is calculated first by measuring the thickness of a given square or circular piece of sheet with a micrometer, multiplying by the surface area to obtain the volume, and weighing the piece to obtain the density (weight/volume). The BWC for each sorbent material sheet may be greater than about 10 g/100 cc, and in some embodiments, the BWC may be from about 7.0 g/100 cc to about 30 g/100 cc, about 8.0 g/100 cc to about 25 g/100 cc, about 10 g/100 cc to about 20 g/100 cc, about 10 g/100 cc to about 15 g/100 cc, about 11 g/100 cc to about 15 g/100 cc, about 12 g/100 cc to about 15 g/100 cc or any individual BWC or range encompassed by these example ranges. In other examples, the BWC may be about 9 g/100 cc to about 15 g/100 cc, about 12 g/100 cc to about 20 g/100 cc, about 13 g/100 cc to about 20 g/100 cc, about 14 g/100 cc to about 20 g/100 cc, or about 15 g/100 cc to about 20 g/100 cc. It is also contemplated that any of the endpoints of the above ranges may be combined to form new and distinct ranges.

The sorbent material sheets of embodiments can be made by any suitable process. In some embodiments, sorbent material sheets can be made by pulverizing granular or pelletized sorbent material to a powder, mixing the powder with a binder to form a mixture, heating and blending the mixture, and rolling the mixture to form the sorbent material sheet. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm. The step of mixing the powder with a binder may include mixing the sorbent particle powder with about 2% to about 20% by weight or about 2% to about 10% by weight of the total composition, or any individual amount or range encompassed by these example ranges. Heating can be carried out at any temperature sufficient to remove residual solvent such as, for example, about 50° C. to about 200° C.

The sorbent material sheet may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of at least two different particle populations, each having a particular size distribution, may be selected so that they have a ratio of between about 1:1 and about 1:15: In other embodiments, the mean particle sizes of the two different particle populations may have a ratio of about 1:1 to about 1:10. The mean particle sizes may also have a ratio of about 1:1 to about 1:5, or combinations of any of the above listed ratios.

In some embodiments, the sorbent material or sorbent material sheets may include a thermally conductive filler to increase the heat transfer of the sorbent material sheets. The thermally conductive filler may be a polymer, metal, or ceramic. In some embodiments, the thermally conductive filler is also electrically conductive, which reduces the risk of ignition by dissipating any accumulated electrical charge. The thermally conductive filler may be in the form of powder, wires, chopped fibers, chopped wires, platelets, and combinations of the above. The thermally conductive filler may be made of a transition metal, aluminum, steel, copper, silver, boron nitride, graphite, carbon black, alumina, diamond, silica, and combinations thereof.

The VRU

The sorbent material or sorbent material sheets described above are incorporated into a VRU. The VRU includes at least one VRU heat exchanger, and each VRU heat exchanger includes the sorbent material described above. The VRU heat exchangers are cooled or heated as needed during absorption and desorption operations. The VRU of the invention prevents the formation of zones of high temperature in the sorbent material or sorbent material sheets. The VRU also prevents formation of zones of extremely low temperature in the sorbent material or sorbent material sheets.

The VRU of the invention includes at least one VRU heat exchanger that may be used during adsorption or desorption of vapors, such as hydrocarbon vapors. The VRU heat exchanger may be a shell and tube heat exchanger, plate heat exchanger, plate and shell heat exchanger, phase change heat exchanger, helical coil heat exchangers, and spiral heat exchangers. The VRU heat exchanger is selected based on various factors including cost, size, performance, and packaging for the sorbent material sheets. The VRU heat exchanger of the VRU includes space for the inclusion of the sorbent material sheets and a separate space for a heat transfer fluid.

During the adsorption cycle, hydrocarbon vapors, such as vapors from the ullage of a storage or vehicle tank, are passed over the sorbent material or sorbent material sheets. This causes the sorbent material or sorbent material sheets to adsorb the vapors. The adsorption cycle is exothermic, generating heat as the sorbent material adsorbs the vapors. The heat transfer fluid removes this heat from the sorbent material as the sorbent material adsorbs the vapors. The removal of the heat maintains adsorption performance and prevents thermal runaway or ignition.

The opposite occurs during the desorption cycle. During the desorption cycle, a low pressure vacuum is created over the sorbent material, typically using a vacuum pump. This lowered pressure causes the adsorbed hydrocarbon vapors to desorb, or be removed from sorbent material. The desorption process is endothermic, and the desorbed vapors reclaimed by being condensed are returned to a storage tank so that they can be used or sold. If the desorption cycle results in process temperatures that are too cold, heat may be provided using the heat transfer fluid. This prevents freezing of compounds such as water that may be present in the VRU heat exchanger.

In one embodiment, at least one VRU heat exchanger is a shell and tube heat exchanger. In such a configuration, the sorbent material is packed within at least one cylindrical tube and a heat transfer fluid flows in the heat transfer fluid chamber between the tube and the shell of the heat exchanger. The sorbent material can be inserted within the cylindrical tube in any configuration. For example, the sorbent material can be granular and deposited as a bed within the cylindrical tube. In another example, the sorbent material is provided as a sorbent material sheet and is wound in a spiral or concentric circular shape and inserted into the tube. The tubes have various inner and outer diameters which are selected based on design space and required performance.

The inner diameter of the VRU heat exchanger tubes is not particularly limited. In some embodiments, the inner diameter of the VRU heat exchanger tubes may range from about 0.5 inches to about 6 inches. The tube diameter may be about 0.5 inches, about 1.0 inches, about 1.5 inches, about 2.0 inches, about 2.5 inches, about 3.0 inches, about 3.5 inches, about 4.0 inches, about 4.5 inches, about 5.5 inches, or about 6 inches, or any range formed from the above listed amounts. The tube may have a diameter of about 1 inch to about 5 inches, about 2 inches to about 4 inch, or about 2.5 inch to about 3.5 inches.

The selection of VRU heat exchanger tubes of the above diameter means that excellent heat transfer performance is achieved. This is especially useful during the adsorption cycle, because efficient heat conduction can be achieved across the sorbent material, and this avoids hot spots that could slow down the adsorption process or worse, cause ignition or a run-away exothermic reaction. This is because the ability of the sorbent sheets to adsorb hydrocarbons such as butane is inversely proportional to rising temperature. As temperature increases, the adsorption capacity of the sorbent material decreases. By maintaining cool temperatures in the sorbent sheets, increased adsorbent capacity is achieved.

Further synergies are achieved when combining structure of the sorbent material sheets with the VRU heat exchanger tubes. This enables both efficient packing of the sorbent material and excellent thermal transfer through the sheets to the walls of the VRU heat exchanger tubes.

The heat transfer fluid of the VRU heat exchanger may be any fluid that is commonly used in the art, and may include air, water, nitrogen gas, oxygen gas, refrigerant, mineral oils, silicone oil, and combinations of the above. The above may be combined with additives which are included for the purposes of corrosion inhibition, freezing-point depression, freezing-point elevation, boiling-point depression, boiling-point elevation, and lubrication. Examples of such compounds include ethylene glycol, methanol, propylene glycol, glycerol, lubricant oils, and the like, which may be used alone or in combination.

In some embodiments, multiple VRU heat exchangers are be combined for even further improved, synergistic results during adsorption and desorption cycles as follows. In these embodiments, there is at least one VRU heat exchanger operating in "desorption mode" and at least one counterpart VRU heat exchanger operating in "adsorption mode." In the operation of the VRU heat exchanger in exothermic adsorption mode, waste heat is removed by the heat transfer fluid, and at least some of that waste heat may be dissipated in the VRU heat exchanger in endothermic desorption mode, preventing the overcooling situation described earlier. The remainder of the waste heat may be dissipated as needed, for instance using a radiator or evaporative cooling. Similarly, cooled heat exchange fluid resulting from the endothermic desorption mode can be used as the heat exchange fluid in the exothermic mode. These cycles may be operated simultaneously or at different times, for instance by employing a tank of stored heat transfer fluid which is held until needed for the next adsorption or desorption process.

The VRU heat exchanger can be made of a variety of materials, but is generally made of stainless steel and aluminum.

The VRU may include various seals that are designed to prevent liquids and gases from moving outside of their designated compartments. The seals may be designed and provided as is known in the art, and the seals may include gaskets, welds, adhesives, solder, brazing, and the like. The specific techniques and materials for the seals are selected depending on the mating materials and liquids and gases which are to be interfaced and/or prevented from contacting each other.

The configuration of the VRU heat exchangers depends on the expected service demands, the volume of hydrocarbons that is intended to be serviced, and other factors that control the amount of hydrocarbon vapors that are generated and that are desirous to recover. For example, in one embodiment that is described more fully in the Examples, a VRU includes two VRU heat exchangers, each having 60 three inch (3") diameter tubes. Each tube is 40 inches (40") in length and incorporates rolled sorbent materials sheets that include high performance activated carbon sorbent, again described in the Examples below. Larger facilities that include more tubes, where the tubes are of larger diameter, where the tubes have greater amounts of carbon, or where the tube temperatures are more aggressively controlled are possible where additional performance is required. Greater performance is often required in locations where gasoline is more rapidly purchased and consumed in surrounding filling stations. Conversely, lower performance may be required in locations where gasoline is purchased and consumed at a slower rate, thus permitting the VRU to have smaller diameter tubes, fewer tubes, and less aggressive control of tube temperatures.

Figure 2:
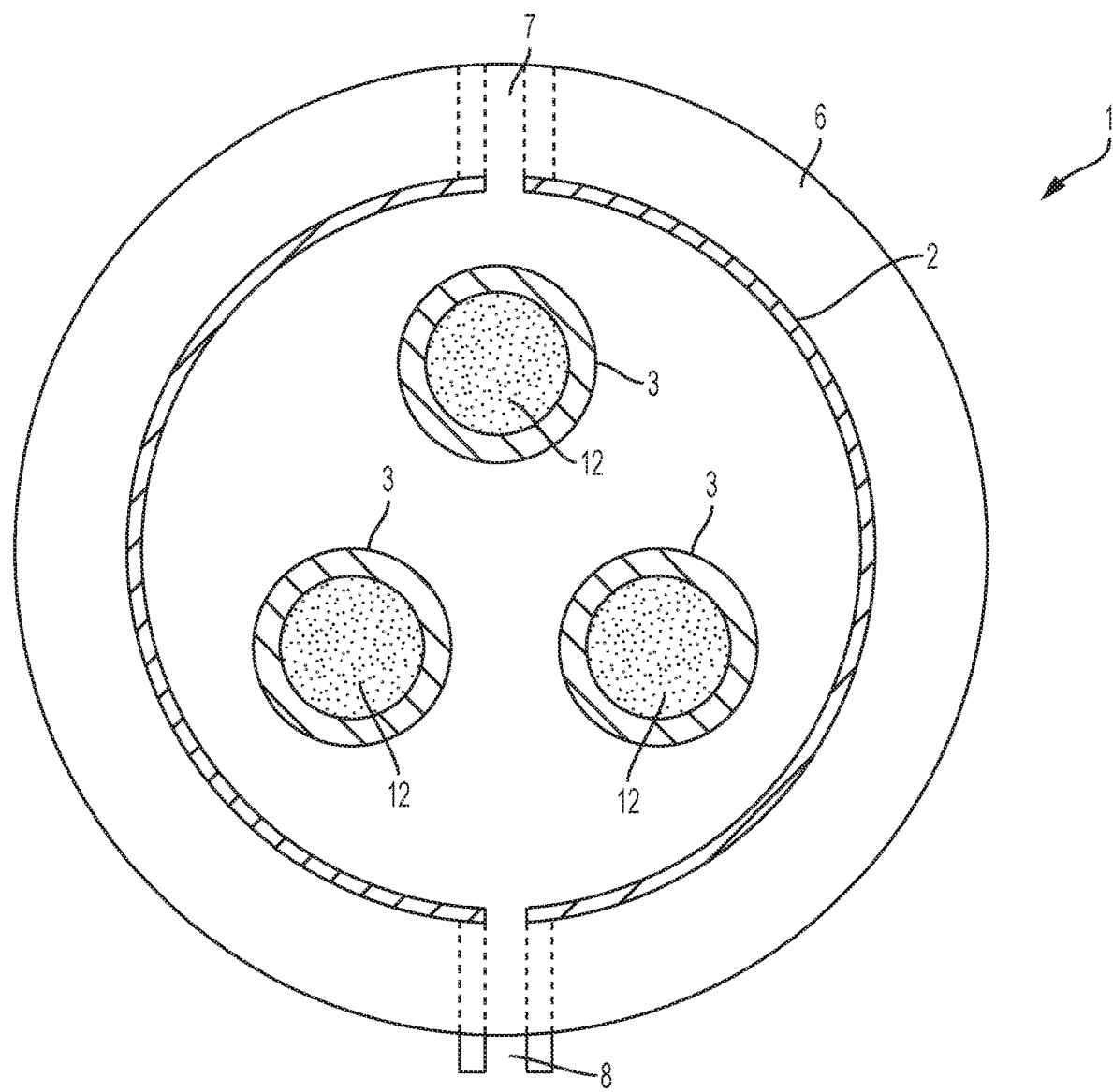
FIG. 2 is a second cross-sectional view of a VRU heat exchanger of the invention.

FIGS. 1 and 2 are cutaway views of a small scale embodiment of the invention. In FIG. 1, a shell and tube heat exchanger 1 includes shell 2. Within the shell 2 are sorbent material chambers 3 that contain sorbent materials 12. At least two manifold spaces 4 and 11 distribute vapors which are to be collected from the ullage of a tank to the sorbent tubes 3 and the sorbent materials 12 which are disposed therein. The manifold spaces 4 and 11 also permit desorption of the captured vapor from the sorbent material chambers 3 and sorbent materials 12.

The manifold spaces 4 and 11 are formed between tube sheets 9 and the respective manifold caps 13 and 14. The manifold caps 13 and 14 have respective ports 5 and 10 which is used to transfer the vapors from the tank ullage during adsorption, or to be collected during desorption. For transfer of vapors, liquids, and other compounds into and out of the manifold spaces 4 and 11, ports 5 and 10 are used.

Shell and tube heat exchanger 1 further includes tube sheets 9 which separate the heat transfer fluid chamber 15 from the interior of the sorbent material chambers 3. Manifold seals 6 are used to enclose the manifold spaces 4 and 11 and along with tube sheets 9 direct the vapors, liquids, and other compounds into and out of the sorbent tubes 3. In the depicted embodiment, the seal 6 is a gasket placed between the mating surfaces of the manifold caps 13 and 14 and the tube sheets 9. However, other seals may be placed depending on need and are not shown here. For movement of heat transfer fluid into and out of the heat transfer fluid chamber 15, inlet 7 and outlet 8 are provided. While not shown in the Figures, it is contemplated that one or more baffles may be installed within the heat transfer fluid chamber 15 to ensure efficient mixing and heat transfer from heat transfer fluid as it moves through the shell and tube heat exchanger 1.

In some embodiments, the sorbent material chambers 3 are tube shaped and have an inner diameter of 3 inches and a length of 40 inches. In some embodiments, ports 5 and 10 have a diameter of 1 inch, and can have a National Pipe Taper (NPT) thread. In some embodiments, ports 7 and 8 have a diameter of 0.5 inches, and can have an NPT thread.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

A shell and tube heat exchanger design incorporates rolled sorbent material sheets that include an activated carbon sorbent. The rolled sorbent material sheets are packed into the tubes of a shell and tube heat exchanger. Each shell and tube heat exchanger includes 60 three inch (3") diameter tubes, each of which are 40 inches (40") in length. The tubes form the sorbent material chambers. Each shell and tube heat exchanger includes 300 lbs of sorbent material, which is high performance, 15 g/100 cc BWC activated carbon. A VRU includes two such shell and tube heat exchangers, and each of the heat exchangers are connected as needed to a vacuum pump, heat transfer fluid pump, and the ullage space of a tank that has hydrocarbon vapors. This means that there is a total of 600 lbs of activated carbon required. Compared to conventional technologies which rely on beds of 5,000 to 10,000 lbs of activated carbon, this results in a 5 to 10 fold reduction in the required amount of activated carbon, and therefore a significant reduction of installed footprint and capital cost. The shell and tube heat exchanger design also reduces the required size of the associated cooling system, further reducing the installed footprint and capital cost.

Example 2

One measurement of sorbent material performance is Butane Working Capacity (BWC), which measures the ability of an activated carbon to adsorb and desorb butane from dry air under specified conditions. BWC is a useful proxy of sorbent performance for hydrocarbon vapors, especially gasoline, because n-butane makes up a significant component of many hydrocarbon vapors, including that of gasoline. BWC is measured by first determining the "butane number" which is the adsorption capacity of the sorbent material at a specified temperature with a specified concentration of butane in the atmosphere. Next, the sorbent is desorbed to determine "retentivity," which results in a measured capacity at a specified desorption concentration and temperature. BWC is therefore a measurement of the total ability of a sorbent to adsorb, retain, and desorb butane vapors. In general, high vapor concentrations and low temperatures increase the capacity for adsorption (i.e., the butane number), low vapor concentrations and high temperatures increase the desorption performance (i.e., desorption or retentivity). The BWC test method is described in detail in ASTM method D5228.

Table 1 plots the simulated performance of VRU-F3, a granular coal-based activated carbon product that is sold for use in VRUs by Calgon Carbon Corporation of Moon Township, Pa. The simulation shows the sorbent capacity of a sorbent in grams of solvent per 100 ml of solvent based on temperature and the concentration of solvent in the surrounding atmosphere. In this simulation, the pressure is 1 atmosphere. Table 1 demonstrates that as temperature increases, the sorbent capacity declines. Because sorbent capacity declines with increasing temperature, better control of temperature yields significant improvements in performance. From these simulated results, we infer that the heat exchanger configuration enables adsorption at lower temperatures for a given vapor concentration of butane, which in turn yields increased BWC and therefore, increased adsorption capacity for hydrocarbon vapors.

TABLE 1

| | Simulated Performance of VRU-F3 | | | | |
|---|---|---|---|---|---|
| Butane Concentration (ppmv) | BWC (g butane/100 ml); 0° C. | BWC (g butane/100 ml); 25° C. | BWC (g butane/100 ml); 50° C. | BWC (g butane/100 ml); 75° C. | BWC (g butane/100 ml); 100° C. |
| 1 | 1.164 | 0.723 | 0.442 | 0.268 | 0.162 |
| 10 | 1.875 | 1.241 | 0.812 | 0.524 | 0.335 |
| 100 | 2.961 | 2.080 | 1.449 | 0.999 | 0.682 |
| 1000 | 4.615 | 3.410 | 2.513 | 1.843 | 1.342 |
| 10000 | 7.145 | 5.515 | 4.263 | 3.294 | 2.539 |
| 100000 | 11.066 | 8.882 | 7.153 | 5.774 | 4.666 |
| 1000000 | 17.197 | 14.348 | 12.008 | 10.077 | 8.478 |

The invention claimed is:

1. A vapor recovery unit (VRU), comprising:
    a first shell and tube VRU heat exchanger that comprises
        a plurality of tubes each forming a sorbent material chamber,
        a sorbent material contained within each sorbent material chamber,
        a shell, defining a heat transfer fluid chamber for housing a thermal transfer fluid wherein each of the plurality of tubes is within the heat transfer fluid chamber,
        a manifold in fluid communication with an ullage space of a tank, wherein during operation, the sorbent material captures vapors that originated in the ullage space of the tank or releases fluids to the tank; and
    a second shell and tube VRU heat exchanger that comprises
        a plurality of tubes each forming a sorbent material chamber,
        a sorbent material contained within each sorbent material chamber,
        a shell, defining a heat transfer fluid chamber wherein each of the plurality of tubes is within the heat transfer fluid chamber,
        a manifold in fluid communication with the ullage space of a tank, wherein during operation, the sorbent material captures vapors that originated in the ullage space of the tank or releases fluids to the tank,
    a temperature control device for heating or cooling the thermal transfer fluid, and
    a thermal transfer fluid connection between the first VRU heat exchanger and the second VRU heat exchanger, wherein the thermal transfer fluid connection permits thermal transfer fluid to be exchanged between the first VRU heat exchanger and the second VRU heat exchanger,
    further comprising a thermal transfer fluid storage medium for storing and dispensing the thermal transfer fluid to the first VRU heat exchanger, the second VRU heat exchanger, or both.

2. A method for operating a vapor recovery unit (VRU) wherein the VRU includes a first shell and tube VRU heat exchanger and a second shell and tube VRU heat exchanger wherein each tube contains a sorbent material, the method comprising:
- operating the first VRU heat exchanger in an exothermic adsorption mode and operating the second VRU heat exchanger in an endothermic desorption mode, thereby generating waste heat in the first VRU that is removed by moving a heat transfer fluid through the first VRU, dissipating at least a first portion of the waste heat by moving the heat transfer fluid through the second VRU wherein the endothermic desorption mode cools the heat transfer fluid which, once cooled, is moved through the first VRU, thereby cooling the first VRU.

3. The method of claim 2, further comprising storing heat transfer fluid until the heat transfer fluid is moved through the first VRU heat exchanger or the second VRU heat exchanger.

4. The method of claim 2, further comprising dissipating at least a second portion of the waste heat in a radiator or evaporative cooler.

\* \* \* \* \*